(12) United States Patent
Becker (10) Patent No.: US 9,528,544 B2
(45) Date of Patent: Dec. 27, 2016

(54) DRIVE SHAFT ASSEMBLY HAVING A FLEXIBLE, FLOCKED DRIVE SHAFT, AND METHOD FOR ITS MANUFACTURE

(71) Applicant: Brose Fahrzeugteile GmbH & Co. KG, Coburg, Coburg (DE)

(72) Inventor: David Becker, Royal Oak, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 40 days.

(21) Appl. No.: 14/531,733

(22) Filed: Nov. 3, 2014

(65) Prior Publication Data

US 2015/0126293 A1    May 7, 2015

Related U.S. Application Data

(60) Provisional application No. 61/899,631, filed on Nov. 4, 2013.

(30) Foreign Application Priority Data

Jan. 24, 2014  (DE) .................. 10 2014 201 320

(51) Int. Cl.
*F16C 1/06* (2006.01)
*B05D 1/14* (2006.01)
*B60N 2/02* (2006.01)
*F16C 1/02* (2006.01)

(52) U.S. Cl.
CPC . *F16C 1/06* (2013.01); *B05D 1/14* (2013.01); *B60N 2/02* (2013.01); *F16C 1/02* (2013.01); *F16C 2326/01* (2013.01)

(58) Field of Classification Search
CPC .......... F16C 1/02; F16C 1/06; F16C 2326/01; B60N 2/02; B05D 1/14
USPC ...... 464/52, 180, 181, 53; 296/65.01, 65.15; 297/330
See application file for complete search history.

(56) References Cited

U.S. PATENT DOCUMENTS

| | | | | |
|---|---|---|---|---|
| 2,889,695 | A | * 6/1959 | Moeller | .................... F16D 3/72 464/180 |
| 3,389,579 | A | 6/1968 | Werner et al. | |
| 4,747,799 | A | * 5/1988 | Kato | ......................... F16C 1/06 464/180 |

(Continued)

FOREIGN PATENT DOCUMENTS

| DE | 103 13 969 A1 | 10/2004 |
|---|---|---|
| DE | 20 2007 017 891 U1 | 4/2008 |

(Continued)

*Primary Examiner* — Gregory Binda
(74) *Attorney, Agent, or Firm* — Lewis Roca Rothgerber Christie LLP (57) ABSTRACT

A drive shaft assembly, e.g. as part of a rail adjustment system for a vehicle seat, with a flexible drive shaft for transferring an adjustment force, is provided wherein the drive shaft has central part extending between the two shaft ends of the drive shaft, and the drive shaft is located with its central part at least partially in an elongate guide of the drive shaft assembly. At the central part of the drive shaft several sections arranged in the guide are provided with directly applied flock fibers, in a flocking process on a lateral surface of the drive shaft, which are spaced from each other along a shaft axis of the drive shaft and at which an outer diameter of the drive shaft is enlarged locally with regard to sections abutting these.

8 Claims, 4 Drawing Sheets

(56) References Cited

U.S. PATENT DOCUMENTS

| | | | |
|---|---|---|---|
| 7,367,605 B2* | 5/2008 | Tores | B60N 2/4435 |
| | | | 296/65.15 |
| 8,827,820 B1* | 9/2014 | Mellor | F16C 1/06 |
| 2001/0052721 A1 | 12/2001 | Tanaka | |
| 2005/0121586 A1 | 6/2005 | Tores | |
| 2008/0220883 A1 | 9/2008 | Yuen | |
| 2009/0272869 A1* | 11/2009 | Beneker | B60N 2/067 |
| | | | 296/65.15 |

FOREIGN PATENT DOCUMENTS

| | | |
|---|---|---|
| DE | 10 2007 027 322 A1 | 12/2008 |
| EP | 1 286 065 A1 | 2/2003 |
| WO | WO 92/08061 | 5/1992 |

* cited by examiner

FIG 3A

FIG 3B

DRIVE SHAFT ASSEMBLY HAVING A FLEXIBLE, FLOCKED DRIVE SHAFT, AND METHOD FOR ITS MANUFACTURE

CROSS-REFERENCE TO RELATED APPLICATION

This application claims priority to and the benefit of U.S. Provisional Patent Application No. 61/899,631 filed on Nov. 4, 2013, and to German Patent Application No. 10 2014 201 320.8 filed on Jan. 14, 2014, the entireties of which are incorporated by reference herein.

BACKGROUND

The present invention relates to a drive shaft assembly, a rail adjustment system with a drive shaft assembly and a method of manufacturing a drive shaft assembly.

A generic drive shaft assembly has at least one flexible drive shaft for transferring an adjustment force and an elongate guide. The flexible drive shaft thereby comprises a central part extending between the two shaft ends of the drive shaft, which is at least partially arranged in the elongate guide. The physical guide for the flexible drive shaft is for example formed by a flexible guide tube into which the central part is inserted, and/or by a guide channel in a retaining element which mounts the flexible drive shaft in a rotational manner.

Such a drive shaft assembly is for example part of a drive of a rail adjustment system for a vehicle seat in order to displace the vehicle seat in a longitudinal seat direction. For this, the rail adjustment system typically has two pairs of rails, where respectively a first rail is mounted relative to a second rail in a longitudinally displaceable manner, and the two first rails are adjustable together relative to the two second rails of the rail pairs by means of a drive device of the rail adjustment system. The flexible drive shaft of the drive shaft assembly is hereby arranged at a typically plate-shaped retaining element that is fixed to the two first rails. The flexible drive shaft is driven at one shaft end by a drive motor of the drive device, for a rotation around its shaft axis and is, at its other shaft end, in operative connection with a spindle drive at one of the two rail pairs. The flexible drive shaft is for example coupled to a spindle gear having a pivot-mounted spindle nut, and, when rotating the flexible drive shaft, is driven for a rotation around a fixed spindle axis. By means of the rotation of the spindle nut, the spindle gear moves along the spindle axis of the spindle and thereby is the first rail connected to the spindle gear relative to the second rail holding the spindle. In parallel, the first rail of the other rail pair is displaced relative to its second rail. Such a rail adjustment system with a drive shaft assembly is for example known from DE 10 2007 027 322 A1. In addition, US 2001/00 52 721 A1, US 2005/01 21 586 A1 and WO 92/08061 A1 show comparable drive shaft assemblies.

It is known in particular from the above-mentioned specifications to provide flock fibers at a flexible drive shaft or at a guide for the drive shaft, and thereby to provide a flocking within the scope of the manufacturing process of a drive shaft assembly. For example, the central part extending between two shaft ends of a flexible drive shaft which is arranged within a guide, e.g. a flexible guide tube is provided evenly with flock fibers in order to reduce a play between the guide and the drive shaft in the region of the central part, and to avoid the generation of noise during a rotation of the flexible drive shaft by means of abutting or rubbing against an inner surface of the guide.

In practice it has however been shown that undesired noise and vibrations can occur during a rotation of the drive shaft with an increased operating time, as the flock fibers are compressed over time. In particular, with rail adjustment systems for a vehicle seat it has been observed that, within the expected life span of the drive shaft assembly, measurable and possibly even noticeable vibrations and audible noise can occur when the vehicle seat is adjusted by means of the rail pairs of the rail-adjustment system along the longitudinal axis of the seat. Due to the relatively high rotational speeds of the flexible drive shaft, a buzzing sound can possibly be heard, for example, when the drive shaft rotates, and is already in use for some time.

From EP 1286065 A1, a wound flexible drive shaft is known, in which a flocked wire is used for an outer winding. The single flocked wire is spirally wound around the shaft axis of the drive shaft and is placed into a circumferential gap in the outer winding. The production of such a flexible drive shaft with flock fibers requires in particular a previous production of a flocked single wire and an adaptation of the winding process for the manufacture of the drive shaft, and therefore appears relatively elaborate and expensive.

SUMMARY

Proceeding from this, the present invention has the object to further improve a drive shaft assembly with a flexible drive shaft of the type mentioned above, and in particular, to provide an improved production method with which the aforementioned disadvantages are avoided or at least reduced.

With a drive shaft assembly according to an exemplary embodiment of the invention, a plurality of sections with flock fibers arranged in the guide are provided at the central part, which are spaced along a shaft axis of the drive shaft, and at which an outer diameter of the drive shaft is locally enlarged with regard to sections of the central part abutting them. Consequently, according to the invention, at the central part of the flexible drive shaft are provided sections with flock fibers applied directly to a lateral surface of the drive shaft by means of a flocking process in such a manner that, between two sections with flock fibers, a visible gap is present at the outer surface of the drive shaft along the shaft axis and that respectively locally a thickening is formed at the drive shaft by a section with flock fibers.

In that the flexible drive shaft is not evenly covered with flock fibers at its central part, but only radially protruding sections are provided with flock fibers specifically at certain locations, an uncontrolled and with regard to its position along the shaft axis undefined compression of flock fibers resulting during the life span by means of the rotation of the drive shaft can be avoided. Rather, just the sections with flock fibers which locally lead to an increase in diameter of the flexible drive shaft and abut the guide are also strained more during operation, so that operation noise or vibrations possibly resulting due to wear can be avoided and/or controlled in a more specific manner. Also, by means of the specific arrangement of sections with flock fibers spaced to each other and enlarging the outer diameter of the flexible drive shaft, a (natural) frequency of the flexible drive shaft can be influenced in a specific manner, in order to avoid the occurrence of annoying operation noise and vibrations, even after longer operation.

A section with flock fibers locally enlarging the outer diameter thereby preferably extends along the shaft axis with a certain length.

Basically, a (higher) local flocking of the central part is possible thereby, without the need that a section with flock fibers has to extend continuously along the circumference of the drive shaft. In one embodiment version, each of the sections with flock fibers enlarging the outer diameter proceeds continuously along the circumference of the drive shaft, so that the drive shaft is thickened locally in an annular or cylindrical manner at the section with flock fibers.

In exemplary embodiment versions, at least two different outer diameters are defined by sections with flock fibers at the central part of the flexible drive shaft. This includes for example the case that two separated sections with flock fibers each define a mutually different outer diameter of the drive shaft, in that for example the drive shaft has, at a first section with flock fibers, a first outer diameter d1, and at the at least one other section with flock fibers, an enlarged outer diameter d2, where d2>d1, and define, at the two sections of adjacent sections of the central part, a smaller outer diameter of the drive shaft of d0, where d0<d1<d2.

The definition of two different outer diameters of two sections with flock fibers is however also to be understood that between the two sections with flock fibers, which respectively locally define an identical larger outer diameter d2, there are located sections with or without flock fibers that define a different smaller outer diameter d0, where d0<d2.

Thus, in one exemplary embodiment, at least one section without flock fibers can be provided between two sections with flock fibers.

Alternatively or additionally, sections with flock fibers can also be provided at the central part, which—relative to the shaft axis of the drive shaft—project radially with different strengths, so that a first section with flock fibers locally defines a smaller outer diameter of the drive shaft than second and third abutting sections with flock fibers, between which the first section is located. Consequently, flock fibers per surface with different amounts are locally applied to the central part flexible drive shafts, and/or the density of the flock fibers is adjusted specifically differently in the individual sections.

In exemplary embodiment versions, at least two sections with flock fibers are provided at the central part of the flexible drive shaft, which extend with mutually different lengths along the shaft axis. The individual sections with flock fibers can hereby have approximately the same thickness, but have different lengths. Among these are also embodiment versions where a section with a first thickness and thus with a first diameter d1 has a first length l2, and at least a further section with a second thickness and thus a second diameter d2>d1 has second length l3 deviating therefrom. By means of differently dimensioned sections with flock fibers at the central part of the flexible drive shaft, which are arranged in the elongate guide, the wear and vibration behavior of the flexible drive shaft can be targeted and adapted even better to the application.

In one exemplary embodiment version, sections with flock fibers are arranged equidistantly from one another in relation to the shaft axis at the central part. Alternatively or additionally, sections with flock fibers can (also) have mutually different distances in relation to the shaft axis at the central part.

The flock fibers are preferably made of a cotton material, polyamide and/or a viscose material.

The physical guide of the flexible drive shaft has for example a guide tube in which the central part of the drive shaft is received at least partially. Such a guide tube is preferably designed in a flexible manner.

Alternatively or additionally, the guide can also be formed by a guide channel in which the drive shaft is mounted in a rotational manner. In a rail adjustment system for a vehicle seat having a drive shaft assembly according to the invention, such a guide channel is formed for example by a retaining element which connects the two first rails that are mounted in a longitudinally displaceable manner, thus for example the upper rails of two rail pairs.

By means of the use of a drive shaft assembly according to the invention, a rail adjustment system for a vehicle seat is suggested within the scope of the present invention, which has two rail pairs coupled to each other. With the individual rail pairs, a first rail, for example an upper rail, is respectively mounted relative to a second rail, for example a lower rail, in a longitudinally displaceable manner, and the two first rails of the two rail pairs can be adjusted together relative to the two second rails by means of a drive device of the rail adjustment system. For the transfer of an adjustment force from a drive motor of the drive device, a drive shaft assembly according to the invention is provided, in order to avoid, even after prolonged use, undesired operating noise and/or vibrations by the flexible drive shaft.

A further aspect of the present invention is a manufacturing method for a drive shaft assembly, which has a flexible drive shaft for transferring an adjustment force by rotation around a shaft axis of the drive shaft, and comprises a longitudinally extending guide in which, at least partially, is arranged a central part extending between the two shaft ends of the drive shaft.

With a manufacturing method according to the invention, several sections with flock fibers are provided at the central part of the drive shaft by means of flocking, which are spaced from each other along the shaft axis of the drive shaft and at which an outer diameter of the drive shaft is enlarged locally with regard to sections of the central part abutting this. Following the flocking of the drive shaft, it is arranged in the guide with the flocked sections spaced from each other.

The advantages and characteristics of a drive shaft assembly according to the invention explained above and in the following thus also apply for a manufacturing method according to the invention, and vice versa.

Within the scope of the manufacturing method, sections of the central part can be flocked in different degrees, in order to provide at least two radially projecting and second and third sections with flock fibers at the central part spaced from each other, between which is then arranged a first section with flock fibers projecting to a lesser extent. Hereby it can be provided in particular that the central part in the region of the first, second and third sections is flocked locally to a different degree, sections of the central part abutting these, which are also arranged in the guide at the end of a manufacturing and mounting method, are however not flocked.

In a further exemplary embodiment, which can be readily combined with the above-explained embodiment of a method according to the invention, the central part is flocked at certain locations, but not at others, in order to provide at least two radially projecting second and third sections with flock fibers spaced from one another at that central part, between which a first section without flock fibers is located.

Alternatively or additionally, the central part can be flocked first (locally). Sections first flocked with flock fibers can then be processed later, for example pressed/compacted or deformed by heat exposure, thus e.g. hot stamping, or their flock fibers can be removed in order to generate hereafter the desired sections with flock fibers spaced from each other, at which an outer diameter of the drive shaft is enlarged locally. For example, the central part of the flexible drive shaft can initially be flocked evenly with flock fibers. Subsequently, individual regions are compressed in a targeted manner—possibly with heat exposure—, so that the compressed regions are set back with regard to the abutting regions. The regions abutting the regions with compressed flock fibers then form the sections at which the outer diameter of the flexible drive shaft is enlarged and which are spaced from each other by a section with compressed flock fibers.

The flocking is generally possible in a different manner. The flock fibers are for example applied by means of electrostatic flocking, by means of an adhesive and/or by means of heat exposure.

Within the scope of the method according to the invention, flock fibers are for example applied directly onto the lateral surface of a readily wound flexible drive shaft. Hereby, the drive shaft, in order that it has the desired flexibility, is provided with a layer or several layers of wound wires or produced from them, and is subsequently flocked. In such a manner, an evenly wound drive shaft is provided for example locally at its central part with thickenings of flock fibers subsequently in a downstream flocking process. A winding process during the manufacture of the flexible drive shaft from a wire or several wires thus does not have to be changed, as the application of the flock fibers does not take place by a winding around the shaft axis.

With a drive shaft assembly according to the invention and a manufacture method according to the invention, it is only relevant that an undulating outer contour of the flexible drive shaft results at the regions of the central part, which are arranged in the guide, by means of the sections with flock fibers spaced from each other, which locally define a larger outer diameter of the flexible drive shaft. An undulating outer contour is hereby meant in particular that, at the central part, thickened, in particular bulging sections and compared to these sections, sections that are set back, alternate.

BRIEF DESCRIPTION OF THE DRAWINGS

Further advantages and characteristics of the present invention will become apparent from the following description of exemplary embodiments by means of the figures.

DETAILED DESCRIPTION

Figure 3A:
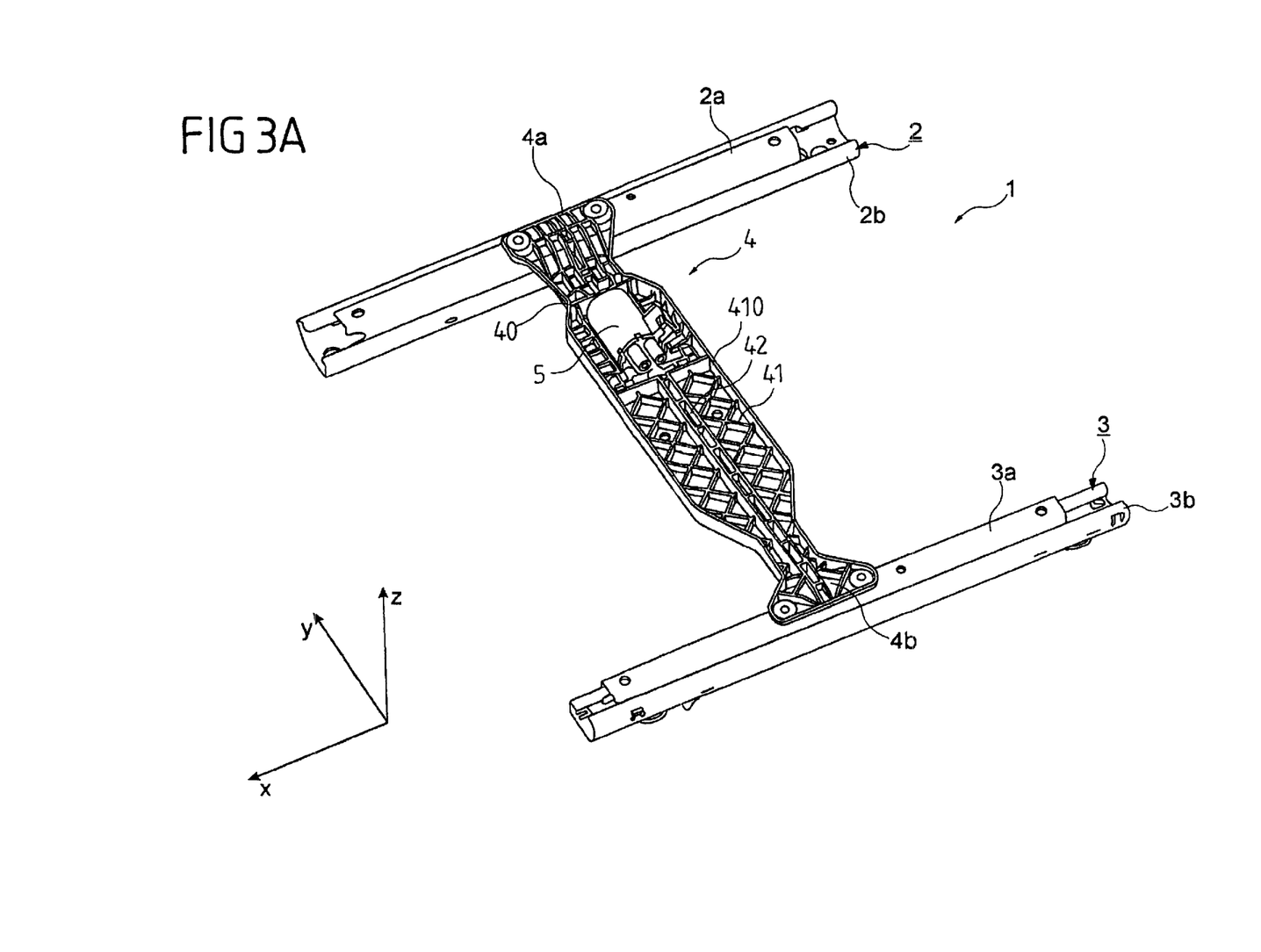
FIGS. 3A-3B show in a perspective view, an embodiment version of a rail adjustment system for a vehicle seat with and without a drive motor, but however respectively with a drive shaft assembly according to the invention.
Figure 3B:
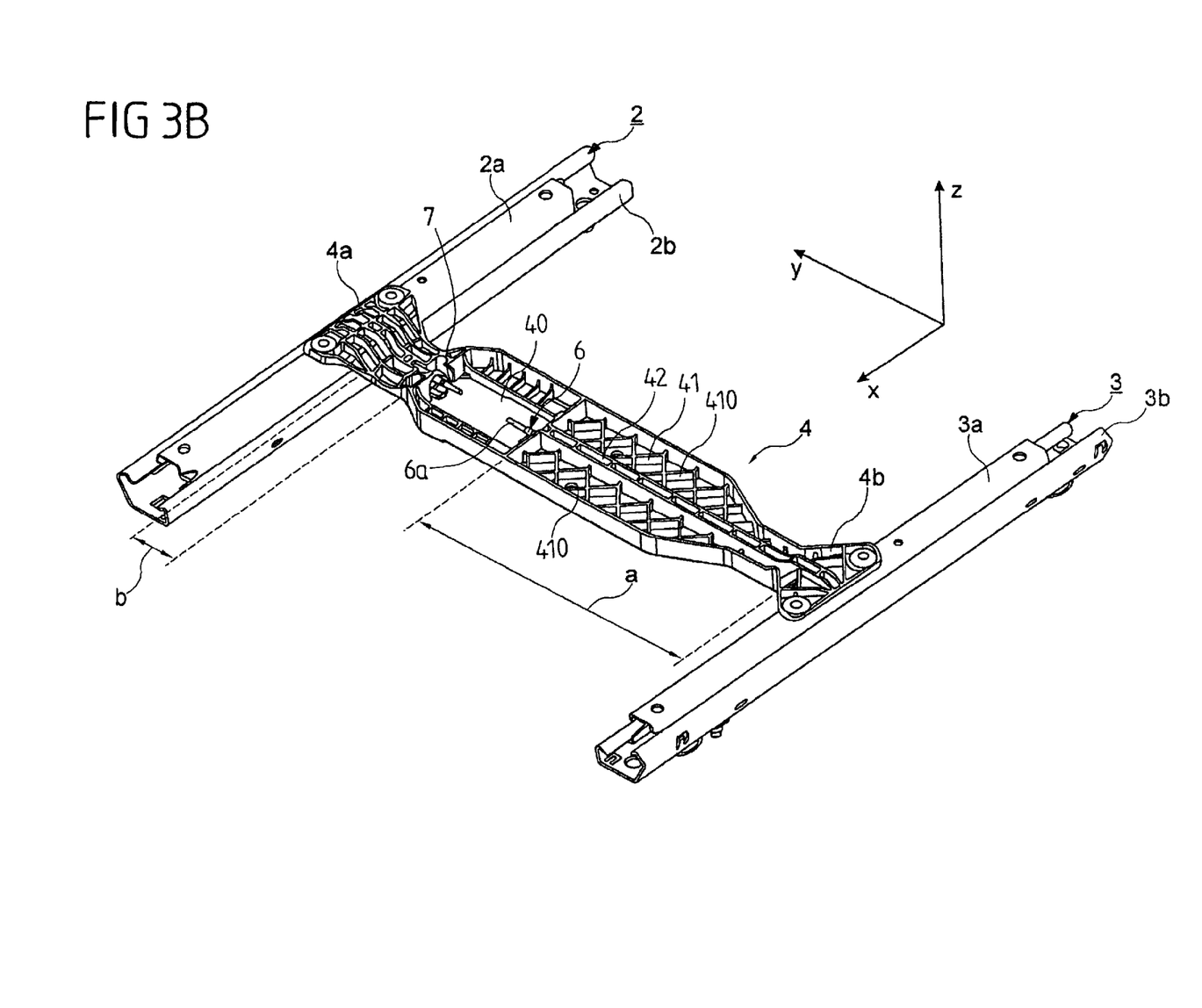

FIGS. 3A and 3B show, in perspective view, respectively, a rail adjustment system 1 for a vehicle seat with two rail pairs 2 and 3 arranged in a spaced manner and opposite to each other. The rail pairs 2 and 3 respectively extend parallel to each other their rails 2a, 2b and 3a, 3b. Each rail pair 2, 3 respectively has a lower rail 2b or 3b to be fixed to a vehicle floor, and an upper rail 2a or 3a mounted in a longitudinally displaceable manner to this. The upper rails 2a and 3a are connected to each other via a plate-shaped retaining element 4. For this, the retaining element 4 is fixed to the upper rail 2a and the upper rail 3a via fixation sections formed as retaining straps 4a and 4b.

In relation to a vehicle coordinate system, the upper rails 2a, 3a can be displaced longitudinally in a x direction with regards to the lower rails 2b and 2c fixed to a vehicle floor. A presently not illustrated vehicle seat is fixed to the upper rails 2a and 3a, with its associated seat frame, in order to be able to adjust the vehicle seat via the illustrated rail adjustment system 1 along the x-direction. The retaining element 4 connecting the upper rails 2a and 3a thus extends along a y-direction transversely to the rail pairs 2 and 3.

Each rail pair 2 and 3 respectively has a spindle drive, wherein, for example, a spindle extending along the x-direction and thereby along a longitudinal rail axis is fixed to the lower rail 2b or 3b fixedly mounted to the vehicle floor and a spindle nut intermeshing therewith is set—preferably with a spindle gear—is fixed to the displaceable upper rail 2a or 3a.

For transferring an adjustment force to the respective spindle nut, a drive device is provided, which comprises, in addition to the retaining element 4, a mounted drive motor 5, for example in the form of an electric motor, and particularly a flexible drive shaft 6. Via the flexible drive shaft 6, an adjustment force is transferred from the drive motor 5 to the spindle drive of the rail pair 3 (in the FIGS. 3A and 3B, right). For transferring an adjustment force from the drive motor 5 to the opposite rail pair 2, a further drive shaft is provided, of which only a shaft journal 7 can be seen in FIG. 3B.

The plate-shaped retaining element 4 thereby carries individual components of the drive device. The drive motor 5 is thus mounted in a recess 40 of the retaining element 4, and, within a guide channel 42 of the retaining element 4, the flexible drive shaft 6 for the (right) spindle pair 3 and, in a further section, the additional shaft for the (left) spindle pair 2 are also mounted. The recess 40 for the drive motor 5 is therefore positioned in a decentralized manner between the two retaining straps 4a and 4b, so that the two drive shafts extend from the drive motor 5 with different lengths a or b to the corresponding rail pair 2 or 3.

The flexible drive shaft 6, which extends from the driving motor 5 to the spindle drive of the rail pair 3 via the greater length a, is housed protectively in the lineally proceeding guide channel 42, which is flanked on both sides by a grid-like support structure 41 along the x-direction. The guide channel 42 therefore extends, starting from the recess 40 arranged in a decentralized manner to the remote upper rail 3a, and is thereby supported on both sides by the grid-like support structure 41 with its grid bars 410.

The flexible drive shaft 6 provided for transferring an adjustment force to the spindle drive of the rail pair 3 and the drive motor 5 coupling with this spindle drive is shown in detail in FIGS. 1 and 2A to 2D, and on a larger scale.

The flexible drive shaft 6 hereby respectively has, in addition to a shaft end 6a coupled with the drive motor 5, a remote second shaft end 6b, which is coupled to the spindle drive of the rail pair 3. A central part 6c extends between these two shaft ends 6a and 6b. This central part 6c is arranged in a flexible guide tube 8 shown in FIG. 1. Together with this guide tube 8, the flexible drive shaft 6 is received within the guide channel 42.

While the flexible drive shaft 6 is shown together with the guide tube 8 in side view in FIG. 1, FIGS. 2A to 2D show possible different embodiment versions of the flexible drive shaft 6. The different embodiment versions of a drive shaft 6 are hereby respectively provided with spaced (shaft)

sections with flock fibers 60, 60a and 60b which locally enlarge the outer diameter d0 of the drive shaft 6 to an outer diameter d2. The individual flock sections 60, 60a and 60b, which are spaced from each other along the shaft axis W of the flexible drive shaft 6, represent themselves respectively as local thickenings of the drive shaft 6, and give the drive shaft 6 in the side view an undulated outer contour.

It has been found that, by the provision of individual spaced sections with flock fibers 60, 60a and 60b at which an outer diameter of the drive shaft 6 is specifically enlarged, operating noise and vibrations by the relatively fast rotating drive shaft 6 during operation are avoided over its life span or are at least considerably reduced. The sections with flock fibers 60, 60a and 60b, at which a local enlargement of the outer diameter of the flexible drive shaft 6 is achieved, can thereby be spaced to each other by sections without flocking. In FIGS. 2A to 2D are shown flexible drive shafts 6, at which are respectively provided (shaft) sections 61 between the mentioned sections 60, 60a and 60b, which are also provided with flock fibers, but which do not project radially as much as the sections 60, 60a or 60b adjacent thereto.

The sections with flock fibers 61 appearing to be recessed in the side view with regard to the outer diameter are for example produced so that the respective flexible drive shaft 6 is first flocked evenly over its entire central part 6c. In connection to this, the flock fibers in the region of the section 61 are then again (completely) removed, or optionally compressed and pressed under heat, so that the thereto adjacent and uncompressed sections 60, 60a and 60b defines a larger outer diameter. Alternatively or additionally, the sections 60, 60a and 60b, on which the outer diameter of the drive shaft 6 is locally enlarged, are produced by the application of the flock fibers with a greater density and/or in a larger amount than in the adjacent sections 61. In each case, a flocking process is herein controlled in such a manner that sections with flock fibers 60, 60a and 60b spaced from each other result at the central part 6c of the flexible drive shaft 6, at which an outer diameter of the drive shaft 6 is locally enlarged.

Figure 2A:
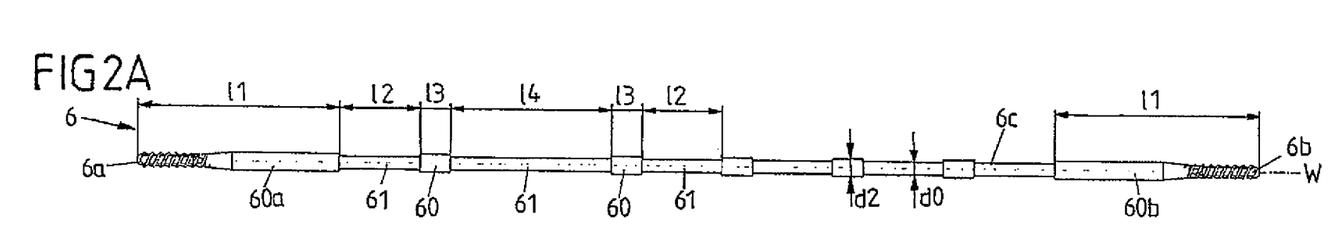
FIGS. 2A-2D show in a side view, different exemplary versions of a flocked, flexible drive shaft for a drive shaft assembly according to the invention.
Figures 2B, 2C:
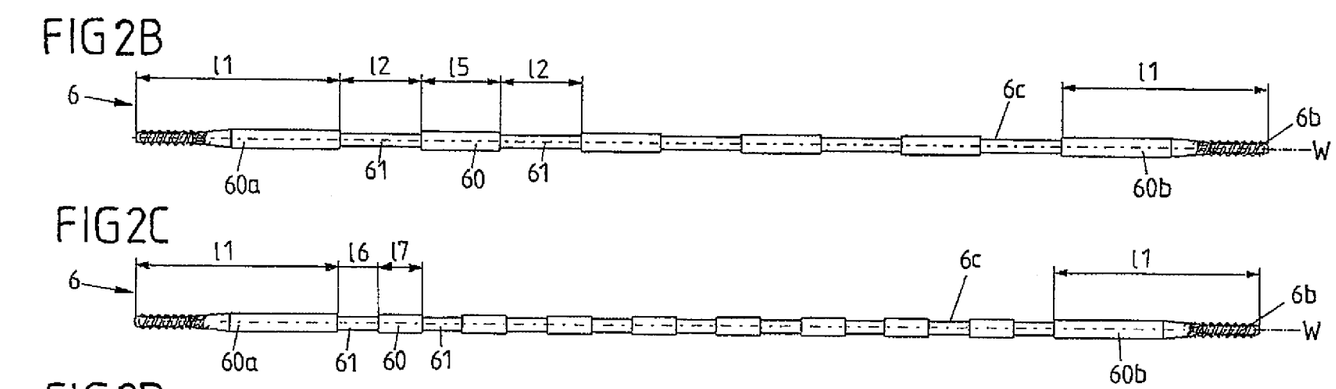

In the embodiment versions of FIGS. 2A, 2B and 2C, a shaft end section 60a and 60b is respectively formed in the region of the shaft ends 6a and 6b, each provided with a thread, as a section with flock fibers at which the outer diameter of the drive shaft 6 is enlarged. The further sections 61, which also define an enlarged outer diameter, thereby differ in their respective length 13, 15 and 17 along the shaft axis W from a length 11 of the shaft end section 60a or 60b. The lengths 13, 15 and 17 of the individual sections with flock fibers 60 provided between the shaft end sections 60a and 60b, at which an outer diameter of the drive shaft 6 is enlarged, comprise only of a fraction of the total length of the drive shaft 6. Preferably, the lengths 13, 15 and 17 are below 1/5, particularly in a 1/10, 1/20 or 1/30 ratio of the total length of the flexible drive shaft 6. The distances or lengths 12, 14 and 16 are in the same magnitude. With the embodiment versions of FIGS. 2A to 2D, the following applies, for example, such that the length 15 corresponds to 1/15 of the total length, the length 17 to 1/30 of the total length, and the length 13 to 1/37 of the total length, where 12=15, 14=2*12, and 16=17. Other proportions are, of course, also possible.

While, with the embodiment versions of FIGS. 2B and 2C, the individual (more highly) flocked sections 60 are arranged equidistant to each other, the (more highly) flocked sections in the exemplary embodiment of FIG. 2A have distances 12 and 14 different to each other.

Figure 2D:
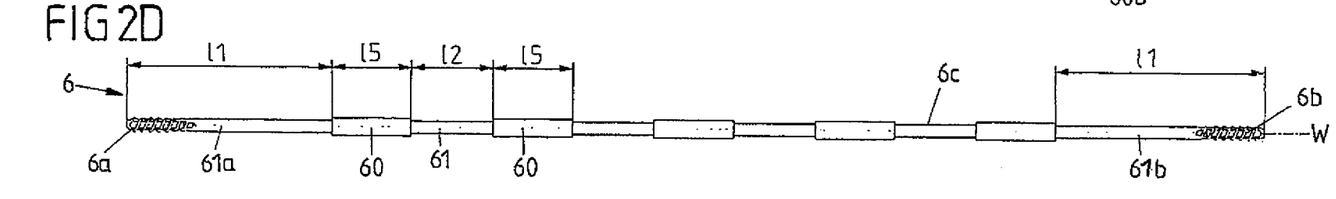

With the embodiment version of FIG. 2D, shaft ends 61a and 61b of a flexible drive shaft 6 are again not flocked or are flocked more weakly. Therefore the (more highly) flocked section 60 is provided to the respective shaft end 6a or 6b only after a larger distance 11. Furthermore, with the exemplary embodiment of FIG. 2D, the individual (more highly) flocked sections 61 are equidistant to each other, and arranged with a constant distance of the length 12 to each other.

By means of the merely local formation of (more highly) flocked shaft sections 60 in such a manner that a local enlargement of the outer diameter of the flexible drive shaft 6 is achieved, the flexible drive shaft 6 has not only a tighter fit within the flexible guide tube 8, but the flexible drive shaft 6 can also be adjusted specifically to the respective application. In addition, interfering operation noise throughout the life span of the drive shaft assembly as well as undesired vibrations during the rotation of the drive shaft 6 can thereby be reduced or even completely avoided. With an unevenly flocked flexible drive shaft 6 according to the invention, significant technical advantages can thus be achieved in a simple manner, in particular in a rail adjustment system 1.

Although not shown here, it can of course naturally hereby also be provided that the flexible drive shaft 6 is not housed in a flexible or rigid guide tube 8 as an elongate guide, but only in a guide channel 42 as a guide. A drive shaft assembly would thus not comprise, in such a case, a guide tube 8, and the flexible drive shaft 6 would be arranged without a further casing in the guide channel 42.

Figure 1:
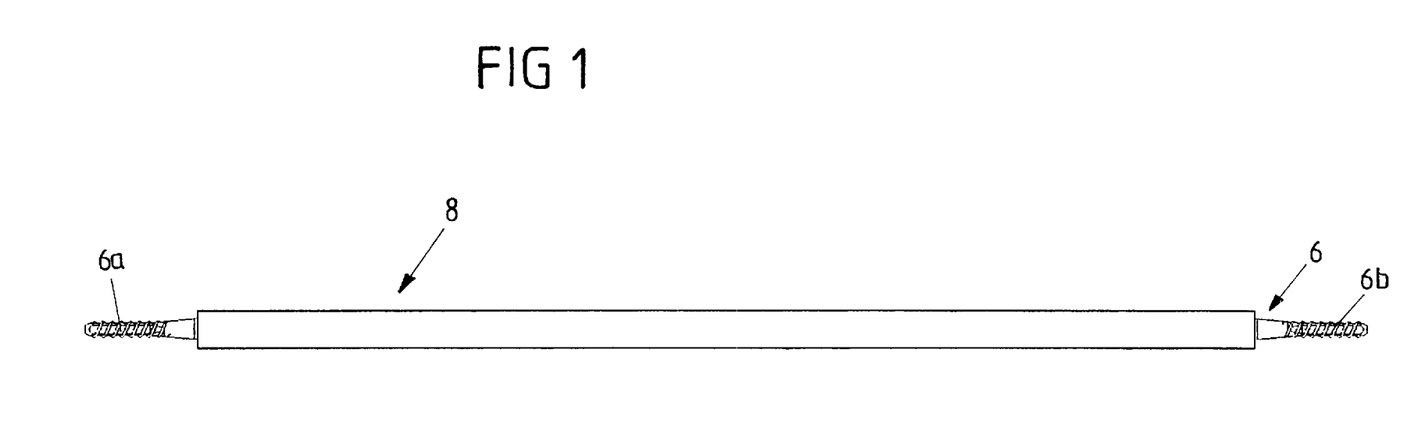
FIG. 1 shows in a side view, an exemplary embodiment of a drive shaft assembly according to the invention with a flexible drive shaft which is arranged in a flexible guide apart from its shaft ends.

Of course, with the illustrated embodiment versions of FIGS. 2A to 2D, different unevenly flocked flexible drive shafts 6 are also conceivable. Furthermore, it is also not necessary for a guide tube 8 to have a planar outer contour as shown in FIG. 1. Likewise, the guide tube 8 could also have an undulating contour.

It should also be noted again at this point that the flock fibers at the shaft sections 60 and possibly also at more weakly flocked shaft sections 61 can be applied, for example, by electrostatic flocking, by means of an adhesive, and/or by heat exposure.

LIST OF REFERENCE NUMERALS

1 Rail adjustment system
2 Rail pair
2a Upper rail
2b Lower rail
Rail pair
3a Upper rail
3b Lower rail
4 Retaining element
40 Recess
41 Support structure
410 Grid bar
42 Guide channel (guide)
4a, 4b Retaining straps (attachment section))
5 Drive motor
6 Drive shaft
60 (more highly flocked) shaft section
60a, 60b Shaft end section
61 (weakly/not flocked) shaft section
61a, 61b Shaft end section
6a, 6b Shaft end
6c Central part
7 Shaft journal
8 Guide tube (Guide)
a, b Width d0, d2 Diameter
l1 -l7 Length

What is claimed is:

1. A drive shaft assembly comprising a flexible drive shaft for transferring an adjustment force, wherein the drive shaft extends between two shaft ends and is at least partially located in an elongate guide of the drive shaft assembly, the drive shaft comprising:
   first and second end sections, each of the end sections being threaded; and
   a central section extending between the end sections, wherein the central section is entirely flocked, the central section comprising:
   a first section having a first diameter; and
   a second and a third section having a second diameter that is greater than the first diameter, wherein the first section is located between the second and third sections, and wherein the second and third sections are spaced according to a natural frequency of the shaft to prevent noise and vibration.

2. The drive shaft assembly according to claim 1, wherein outer diameters of the second and third sections are defined by flocking.

3. The drive shaft assembly according to claim 1, wherein at least two of the sections extend with different lengths along the shaft axis.

4. The drive shaft assembly according to claim 1, wherein the second and third sections are equidistantly arranged with regard to each other along the drive shaft.

5. The drive shaft assembly according to claim 1, comprising multiple ones of each of the second and third sections wherein respective ones of the second and third sections are spaced at different distances to each other along the drive shaft.

6. The drive shaft assembly according to claim 1, wherein the guide has a guide tube, in which the central part is at least partially accommodated.

7. A rail adjustment system for a vehicle seat with two rail pairs where respectively a first rail is mounted relative to a second rail in a longitudinally displaceable manner, and the two first rails of the two rail pairs can be adjusted together by a drive device of the rail adjustment system relative to the two second rails of the rail pairs, wherein the drive device comprises a drive shaft assembly according to claim 1.

8. A drive shaft assembly with a flexible drive shaft for transferring an adjustment force,
   wherein the drive shaft has a central part extending between two shaft ends of the drive shaft and being located at least partially in an elongate guide of the drive shaft assembly,
   wherein an entirety of the central part of the drive shaft is flocked and divided into sections, wherein a plurality of the sections are flocked such that an outer diameter of a first section is greater than a diameter of second sections of the central part abutting a respective first section, and
   wherein at least one of the following is furthermore present:
   at least two first sections extend with different lengths along the shaft axis; or
   at least three first sections are spaced at different distances with respect to each other along the drive shaft.

* * * * *